United States Patent
Chang et al.

(10) Patent No.: US 8,962,184 B2
(45) Date of Patent: *Feb. 24, 2015

(54) ANODE ACTIVE MATERIAL AND SECONDARY BATTERY COMPRISING THE SAME

(71) Applicant: LG Chem, Ltd., Seoul (KR)

(72) Inventors: Sung-Kyun Chang, Daejeon (KR); WonSeok Chang, Daejeon (KR); Je Young Kim, Daejeon (KR); JungMin Han, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,665

(22) Filed: Jun. 7, 2013

(65) Prior Publication Data

US 2013/0266870 A1 Oct. 10, 2013

Related U.S. Application Data

(63) Continuation of application No. PCT/KR2011/009171, filed on Nov. 29, 2011.

(30) Foreign Application Priority Data

Dec. 21, 2010 (KR) ........................ 10-2010-0131384

(51) Int. Cl.
| | |
|---|---|
| H01M 4/134 | (2010.01) |
| H01M 4/133 | (2010.01) |
| H01M 4/36 | (2006.01) |
| H01M 4/48 | (2010.01) |
| H01M 4/587 | (2010.01) |
| H01M 4/62 | (2006.01) |
| H01M 10/052 | (2010.01) |

(52) U.S. Cl.
CPC .............. *H01M 4/133* (2013.01); *H01M 4/366* (2013.01); *H01M 4/483* (2013.01); *H01M 4/587* (2013.01); *H01M 4/621* (2013.01); *H01M 4/628* (2013.01); *H01M 4/362* (2013.01); *H01M 10/052* (2013.01); *Y02T 10/7011* (2013.01); *H01M 4/134* (2013.01); *H01M 4/62* (2013.01); *Y02E 60/122* (2013.01)
USPC ................... 429/218.1; 429/231.8; 429/212; 429/211

(58) Field of Classification Search
USPC ............................ 429/231.8, 218.1, 212, 211
See application file for complete search history.

(56) References Cited

U.S. PATENT DOCUMENTS

| | | | |
|---|---|---|---|
| 2002/0009646 A1* | 1/2002 | Matsubara et al. | 429/231.8 |
| 2004/0115535 A1* | 6/2004 | Morita et al. | 429/231.8 |
| 2005/0287440 A1 | 12/2005 | Chang et al. | |
| 2009/0169994 A1* | 7/2009 | Mah et al. | 429/218.1 |
| 2009/0269669 A1* | 10/2009 | Kim et al. | 429/231.8 |
| 2010/0136432 A1 | 6/2010 | Kim | |
| 2010/0173198 A1* | 7/2010 | Zhamu et al. | 429/222 |
| 2010/0255352 A1* | 10/2010 | Inagaki et al. | 429/7 |
| 2013/0089791 A1* | 4/2013 | Chang et al. | 429/231.8 |
| 2013/0260237 A1* | 10/2013 | Chang et al. | 429/211 |
| 2013/0266867 A1* | 10/2013 | Chang et al. | 429/221 |

FOREIGN PATENT DOCUMENTS

| | | |
|---|---|---|
| JP | 2010-161081 A | 7/2010 |
| KR | 10-2004-0082803 A | 9/2004 |
| KR | 10-2005-0087245 A | 8/2005 |
| KR | 10-2006-0047424 A | 5/2006 |
| KR | 10-2009-0094575 A | 9/2009 |
| KR | 10-2010-0062083 A | 6/2010 |

OTHER PUBLICATIONS

International Search Report issued PCT/KR2011/009171, mailed on Jul. 10, 2012.

* cited by examiner

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Disclosed are an anode active material for secondary batteries, capable of intercalating and deintercalating ions, the anode active material including a core including a crystalline carbon-based material, and a composite coating layer including one or more materials selected from the group consisting of low crystalline carbon and amorphous carbon, and silicon oxide capable of intercalating and deintercalating ions, wherein the composite coating layer includes a matrix comprising one component selected from (a) the one or more materials selected from the group consisting of low crystalline carbon and amorphous carbon and (b) the silicon oxide capable of intercalating and deintercalating ions, and a filler including the other component, incorporated in the matrix, and a secondary battery including the anode active material.

8 Claims, No Drawings

ANODE ACTIVE MATERIAL AND SECONDARY BATTERY COMPRISING THE SAME

CROSS REFERENCE TO RELATED APPLICATIONS

This application is a Continuation of PCT International Application No. PCT/KR2011/009171 filed on Nov. 29, 2011, which claims priority under 35 U.S.C. §119(a) to Patent Application No. 10-2010-0131384 filed in the Republic of Korea on Dec. 21, 2010, all of which are hereby expressly incorporated by reference into the present application.

TECHNICAL FIELD

The present invention relates to an anode active material and a secondary battery comprising the same. More specifically, the present invention relates to an anode active material for secondary batteries, capable of intercalating and deintercalating ions, comprising: a core comprising a crystalline carbon-based material; and a composite coating layer comprising one or more materials selected from the group consisting of low crystalline carbon and amorphous carbon, and silicon oxide capable of intercalating and deintercalating ions, wherein the composite coating layer comprises: a matrix comprising one component selected from one or more materials selected from the group consisting of low crystalline carbon and amorphous carbon, and silicon oxide capable of intercalating and deintercalating ions; and a filler comprising the other component, incorporated in the matrix.

BACKGROUND ART

Technological development and increased demand for mobile equipment have led to a rapid increase in demand for secondary batteries as energy sources. Among these secondary batteries, lithium secondary batteries having high energy density and voltage, long cycle span and low self-discharge are commercially available and widely used.

In addition, increased interest in environmental issues has brought about a great deal of research associated with electric vehicles, hybrid electric vehicles and plug-in hybrid electric vehicles as alternatives to vehicles using fossil fuels such as gasoline vehicles and diesel vehicles which are major causes of air pollution. These electric vehicles generally use nickel-metal hydride (Ni-MH) secondary batteries as power sources. However, a great deal of study associated with use of lithium secondary batteries with high energy density, discharge voltage and power stability is currently underway and some are commercially available.

A lithium secondary battery has a structure in which a non-aqueous electrolyte comprising a lithium salt is impregnated into an electrode assembly comprising a cathode and an anode, each comprising an active material coated on a current collector, and a porous separator interposed therebetween.

Lithium cobalt oxide, lithium manganese oxide, lithium nickel oxide, lithium composite oxide and the like are generally used as cathode active materials of lithium secondary batteries and carbon-based materials are generally used as anode active materials thereof. Use of silicon compounds, sulfur compounds and the like has also been considered.

However, lithium secondary batteries have various problems, in particular, problems associated with fabrication and driving properties of an anode.

First, regarding fabrication of an anode, a carbon-based material used as an anode active material is highly hydrophobic and thus has problems of low miscibility with a hydrophilic solvent in the process of preparing a slurry for electrode fabrication and low dispersion uniformity of solid components. In addition, this hydrophobicity of the anode active material complicates impregnation of highly polar electrolytes in the battery fabrication process. The electrolyte impregnation process is a kind of bottleneck in the battery fabrication process, thus greatly decreasing productivity.

In order to solve these problems, addition of a surfactant to an anode, an electrolyte or the like is suggested. However, disadvantageously, the surfactant may have side effects on driving properties of batteries.

Meanwhile, regarding driving properties of the anode, disadvantageously, the carbon-based anode active material induces initial irreversible reaction, since a solid electrolyte interface (SEI) layer is formed on the surface of the carbon-based anode active material during an initial charge/discharge process (activation process), and battery capacity is reduced due to exhaustion of the electrolyte caused by removal (breakage) and regeneration of the SEI layer during a continuous charge/discharge process.

In order to solve these problems, various methods such as formation of an SEI layer through stronger bond, or formation of an oxide layer on the surface of the anode active material have been attempted. These methods have properties unsuitable for commercialization such as deterioration in electrical conductivity caused by the oxide layer and deterioration in productivity caused by additional processes. Also, there still exists a problem in that growth of lithium dendrites on the surface of the anode active material may cause short-circuit.

Accordingly, there is an increasing need for secondary batteries capable of solving these problems.

DISCLOSURE

Technical Problem

Therefore, the present invention has been made to solve the above and other technical problems that have yet to be resolved.

As a result of a variety of extensive and intensive studies and experiments to solve the problems as described above, the present inventors discovered that, when an anode active material is produced by forming a composite coating layer on a crystalline carbon-based core, various problems associated with anode fabrication and battery driving properties can be simultaneously solved. The present invention has been completed, based on this discovery.

Technical Solution

In accordance with one aspect of the present invention, provided is an anode active material for secondary batteries, capable of intercalating and deintercalating ions, comprising: a core comprising a crystalline carbon-based material; and a composite coating layer comprising one or more materials selected from the group consisting of low crystalline carbon and amorphous carbon, and silicon oxide capable of intercalating and deintercalating ions, wherein the composite coating layer comprises: a matrix comprising one component selected from (a) the one or more materials selected from the group consisting of low crystalline carbon and amorphous carbon and (b) the silicon oxide capable of intercalating and deintercalating ions; and a filler comprising the other component, incorporated in the matrix.

As such, the anode active material having a structure in which the core comprising a crystalline carbon-based material is coated with the composite coating layer having a matrix/filler structure comprising one or more materials selected from the group consisting of low crystalline carbon and amorphous carbon, and silicon oxide capable of intercalating and deintercalating ions can solve the problems in the related art, based on specific active material structure and components.

First, the surface of the silicon oxide capable of intercalating and deintercalating ions comprised as a matrix or filler component in the composite coating layer exhibits high miscibility with a hydrophilic solvent in a slurry for fabrication of an anode according to the type of materials used, thus improving dispensability in solid components in the slurry. Accordingly, when an anode is fabricated by applying this slurry to a current collector, distribution uniformity between components such as a binder and the anode active material can be improved and superior electrode properties can thus be obtained.

The improvement in uniformity caused by the hydrophilic material can minimize a decrease in bonding strength between the slurry and the partial current collector which occurs on the non-uniform electrode. The hydrophilic material improves affinity between the active material layer and the surface of the current collector, bonding strength between the active material layer and the current collector and thereby solves a problem of increase in internal resistance caused by separation of the active material layer from the current collector.

Similarly, the silicon oxide capable of intercalating and deintercalating ions comprised in the composite coating layer imparts relatively high hydrophilicity to at least a part of the anode active material, thereby greatly reducing impregnation time of the highly polar electrolyte in the electrode fabrication process and considerably improving battery productivity.

Second, the silicon oxide capable of intercalating and deintercalating ions comprised in the composite coating layer previously forms a layer that has the same function as SEI having a strong chemical bond and has a stronger bond on the surface of the anode, thereby reducing an amount of irreversible ions required for formation of the SEI layer, minimizes collapse of the SEI layer during repeated charge and discharge and ultimately improves battery lifespan.

Third, the silicon oxide capable of intercalating and deintercalating ions comprised as a matrix or filler in the composite coating layer minimizes deterioration in electrical conductivity which may be induced by presence of materials incapable of intercalating and deintercalating ions.

Also, in the case of a lithium secondary battery, growth of lithium dendrites may occur, since the crystalline carbon-based material serving as a core has a similar electric potential to lithium, but this growth can be inhibited by coating silicon oxide capable of intercalating and deintercalating ions on the surface of the crystalline carbon-based material at a high oxidation-reduction potential.

Best Mode

Hereinafter, the present invention will be described in detail.

As described above, the anode active material according to the present invention comprises: a core comprising a crystalline carbon-based material; and a composite coating layer comprising: a matrix comprising one component (for example, amorphous carbon) selected from one or more materials selected from the group consisting of low crystalline carbon and amorphous carbon, and silicon oxide capable of intercalating and deintercalating ions; and a filler comprising the other component (for example, silicon oxide capable of intercalating and deintercalating ions), incorporated in the matrix.

Generally, a carbon-based material is classified into graphite having a complete layered crystal structure such as natural graphite, soft carbon having a low-crystalline layered crystal structure (graphene structure in which hexagonal honeycomb shaped planes of carbon are arrayed in the form of a layer), and hard carbon having a structure in which the low-crystalline structures are mixed with non-crystalline parts.

In a preferred embodiment, the core component of the present invention, the crystalline carbon-based material may be graphite, or a mixture of graphite and low crystalline carbon, and one of the composite coating layer components may be low-crystalline carbon, amorphous carbon or a mixture thereof.

Meanwhile, silicon oxide capable of intercalating and deintercalating ions which is another component constituting the composite coating layer in the present invention exhibits relatively high hydrophilicity and polarity to one or more materials selected from the group consisting of low crystalline carbon and amorphous carbon and thus provides improved properties in terms of mix preparation or electrolyte impregnation.

A preferred example of the silicon oxide is a substance represented by $SiO_x$. For example, $SiO_2$ intercalates and deintercalates very few lithium ions used for lithium secondary batteries. Accordingly, in the formula, x satisfies $0.1<x<1.5$ and is more preferably $0.5<x<1.3$ in order to maintain the structure of silicon oxide and facilitate intercalation and deintercalation of ions.

In the present invention, the structure of the composite coating layer may be determined, depending on matrix and filler components.

In a first exemplary structure, a filler comprising silicon oxide capable of intercalating and deintercalating ions is incorporated in a matrix comprising one or more materials selected from the group consisting of low crystalline carbon and amorphous carbon.

In a second exemplary structure, a filler comprising one or more materials selected from the group consisting of low crystalline carbon and amorphous carbon is incorporated in a matrix comprising silicon oxide capable of intercalating and deintercalating ions.

In the composite coating layer, since the matrix has a structure, components of which have a continuous phase and the filler has a structure, components of which have independent phases, the content of the matrix component is not necessarily greater than the content of the filler component.

In the composite coating layer, the content of one or more materials selected from the group consisting of low crystalline carbon and amorphous carbon, and the content of the silicon oxide capable of intercalating and deintercalating ions are not particularly limited so long as the intended effects of the present invention (described above) can be exerted. In a preferred embodiment, the content of one or more materials selected from the group consisting of low crystalline carbon and amorphous carbon may be 10 to 95% by weight, based on the total amount of the composite coating layer and the content of silicon oxide capable of intercalating and deintercalating ions may be 5 to 90% by weight, based on the total amount of the composite coating layer.

The amount (coating amount) of the composite coating layer is preferably 0.1 to 20% by weight, based on the total amount of the anode active material. When the amount of the composite coating layer is excessively low or the thickness thereof is excessively small, effects caused by formation of the composite coating layer may not be obtained and, on the other hand, when the amount of the composite coating layer is excessively high or the thickness thereof is excessively great, disadvantageously, the desired core-composite coating layer structure may not be formed and capacity may be deteriorated.

The present invention also provides an anode mix comprising the anode active material.

The anode mix according to the present invention comprises 1 to 20% by weight of a binder, and optionally comprises 0 to 20% by weight of a conductive material, based on the total weight of the anode mix.

Examples of the binder include polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohol.

Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

If desired, a filler is optionally added to inhibit expansion of the anode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Other components such as viscosity controllers or adhesion promoters may be added alone or in combination.

The viscosity controller is a component to control the viscosity of the electrode mix and thereby facilitate mixing of the electrode mix and application of the same to a current collector and is present in an amount of 30% by weight or less, based on the total weight of the anode mix. Examples of the viscosity controller include, but are not limited to, carboxymethyl cellulose and polyvinylidene fluoride. In some cases, the afore-mentioned solvent may also act as the viscosity controller.

The adhesion promoter is an auxiliary ingredient to improve adhesion of an active material to a current collector and is present in an amount of 10% by weight, based on the binder and examples thereof include oxalic acid, adipic acid, formic acid, acrylic acid derivatives and itaconic acid derivatives.

The present invention also provides an anode for secondary batteries in which the anode mix is applied to a current collector.

For example, the anode is produced by adding an anode material containing an anode active material, a binder or the like to a solvent such as NMP to prepare a slurry, and applying the slurry to an anode current collector, followed by drying and pressing.

The anode current collector is generally fabricated to have a thickness of 3 to 500 μm. Any anode current collector may be used without particular limitation so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. The anode current collector includes fine irregularities on the surface thereof so as to enhance adhesion of anode active materials. In addition, the current collectors may be used in various forms including films, sheets, foils, nets, porous structures, foams and non-woven fabrics.

The present invention also provides a secondary battery comprising the anode and the battery is preferably a lithium secondary battery.

The lithium secondary battery has a structure in which a lithium salt-containing non-aqueous electrolyte is impregnated into an electrode assembly comprising a separator interposed between the cathode and the anode.

For example, the cathode is prepared by applying a cathode active material to a cathode current collector, followed by drying and pressing and further optionally comprises other components such as binders or conductive materials as described above associated with the configuration of the anode.

The cathode current collector is generally manufactured to have a thickness of 3 to 500 μm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. Similar to the anode current collector, the cathode current collectors include fine irregularities on the surface thereof so as to enhance adhesion to the cathode active material. In addition, the cathode current collector may be used in various forms including films, sheets, foils, nets, porous structures, foams and non-woven fabrics.

The cathode active material is a lithium transition metal oxide comprising two or more transition metals as a substance that causes electrochemical reaction, and examples thereof include, but are not limited to, layered compounds such as lithium cobalt oxide ($LiCoO_2$) or lithium nickel oxide ($LiNiO_2$) substituted by one or more transition metals; lithium manganese oxide substituted by one or more transition metals; lithium nickel oxide represented by the formula of $LiNi_{1-y}M_yO_2$ (in which M=Co, Mn, Al, Cu, Fe, Mg, B, Cr, Zn or Ga, the lithium nickel oxide including one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula of $Li_{1+x}M_{1-y}M'_{1-y}PO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

The binder, the conductive material and optionally added components in association with the anode have been described above.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

Where appropriate, a gel polymer electrolyte may be coated on the separator in order to improve battery stability. Representative examples of the gel polymer may include polyethylene oxide, polyvinylidene fluoride and polyacrylonitrile. When a solid electrolyte such as a polymer is used as the electrolyte, the solid electrolyte may also serve as a separator.

The lithium salt-containing non-aqueous electrolyte is composed of a non-aqueous electrolyte and lithium.

Examples of the non-aqueous electrolyte include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the non-aqueous electrolyte include organic solid electrolytes such as polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the non-aqueous electrolyte include inorganic solid electrolytes such as nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS) and the like.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of a cyclic carbonate such as EC or PC as a highly dielectric solvent and linear carbonate such as DEC, DMC or EMC as a low-viscosity solvent.

Accordingly, the present invention provides a middle- or large-sized battery pack comprising the secondary battery as a unit battery.

The middle- or large-sized battery pack has a considerably large battery cell (unit cell) size, as compared to a small battery pack in order to obtain high capacity and is thus more generally used in the process of impregnating an electrolyte or the like. Accordingly, according to the present invention, an anode comprising silicon oxide capable of intercalating and deintercalating ions is preferred in consideration of substantial reduction in impregnation time.

Preferably, examples of the battery pack include, but are not limited to, lithium ion secondary battery packs for power storage.

The structure of middle- or large-sized battery packs using a secondary battery as a unit cell and a fabrication method thereof are well-known in the art and a detailed explanation thereof is thus omitted in this specification.

Now, the present invention will be described in more detail with reference to the following examples. These examples are provided only to illustrate the present invention and should not be construed as limiting the scope and spirit of the present invention.

EXAMPLE 1

Graphite having a mean particle diameter of about 20 μm as a core material (A), pitch having a carbonization yield of 50% as a material for low crystalline carbon (B), and silicon oxide (SiO) having a mean particle diameter of about 100 nm as a hydrophilic material (C) were homogeneously mixed in a weight ratio of A:B:C=91:8:1. This mixture was thermally-treated under a nitrogen atmosphere at 1,200° C. for 2 hours in an electric furnace. During thermal treatment, the pitch was softened and carbonized, and at the same time, was coated on a graphite surface in the form of silicon oxide and a composite, to produce an anode active material coated with a carbon/silicon oxide composite.

The anode active material, SBR and CMC were mixed in a weight ratio of active material:SBR:CMC=97.0:1.5:1.5 to prepare a slurry and the slurry was applied to a Cu-foil to prepare an electrode. The electrode was roll-pressed to have a porosity of about 23% and punched to fabricate a coin-type half cell. Li-metal was used as a counter electrode of the cell and a coin-shaped battery was obtained using a 1M $LiPF_6$ electrolyte solution in a carbonate solvent.

COMPARATIVE EXAMPLE 1

An anode active material which had been coated with a carbon/silicon oxide composite prepared in Example 1 and had been further coated with carbon was produced and a coin-type half cell was fabricated in the same manner as in Example 1.

COMPARATIVE EXAMPLE 2

An anode active material was produced and a coin-type half cell was fabricated in the same manner as in Example 1, except that silicon dioxide (SiO$_2$) having a mean particle diameter of about 100 nm was used, instead of silicon oxide (SiO).

COMPARATIVE EXAMPLE 3

An anode active material was produced and a coin-type half cell was fabricated in the same manner as in Example 1, except that the hydrophilic material (C) was not used.

EXPERIMENTAL EXAMPLE 1

Electrolyte impregnation properties of the electrodes fabricated in accordance with Example 1 and Comparative Examples 1 to 3 were evaluated. The electrode was roll-pressed to have a porosity of about 23% and a time taken for 1 microliter (μl) of a 1M LiPF$_6$ electrolyte solution in a carbonate solvent dropped on the surface of the electrode to completely permeate into the surface was measured. Results are shown in Table 1 below.

TABLE 1

|  | Ex. 1 | Comp. Ex. 1 | Comp. Ex. 2 | Comp. Ex. 3 |
| --- | --- | --- | --- | --- |
| Impregnation time (sec) | 91 | 138 | 93 | 142 |

As can be seen from Table 1, the electrode using an anode active material coated with a carbon/metal composite according to Example 1 of the present invention exhibited considerably short electrolyte impregnation times, as compared to Comparative Examples 1 to 3 of electrodes using an anode active material coated with carbon alone. The reason for this is that the surface of the anode active material was coated with a hydrophilic material, thus enabling a highly polar electrolyte to be rapidly permeated into particles.

EXPERIMENTAL EXAMPLE 2

Charge/discharge properties were evaluated using the coin-type half cells fabricated in accordance with Example 1 and Comparative Examples 1 to 3. Specifically, during charge, the cells were charged in a CC mode at a current density of 0.1 C to 5 mV and then maintained in a CV mode at 5 mV, charging was completed when current density reached 0.01 C. During discharge, the cells were discharged in a CC mode at a current density of 0.1 C to 1.5V. As a result, charge/discharge capacity and efficiency of a first cycle were obtained. Then, charge/discharge was repeated 50 times under the same conditions as above, except that the current density was changed to 0.5 C. Results are shown in Table 2 below.

TABLE 2

|  | Ex. 1 | Comp. Ex. 1 | Comp. Ex. 2 | Comp. Ex. 3 |
| --- | --- | --- | --- | --- |
| Charge capacity (mAh/g) | 398.3 | 392.1 | 387.7 | 385.1 |
| Discharge capacity (mAh/g) | 368.1 | 360.7 | 357.1 | 356.6 |
| Efficiency (%) | 92.4 | 92.0 | 92.1 | 92.6 |
| Capacity maintenance (%) after 50 charge/discharge cycles | 89 | 84 | 82 | 78 |

As can be seen from Table 2 above, the anode active materials coated with a composite containing silicon oxide (SiO) as a hydrophilic material according to Example 1 of the present invention exhibited high capacity maintenance after 50 charge/discharge cycles and high efficiency, as compared to Comparative Example 2 using silicon dioxide (SiO$_2$) as a hydrophilic material. The reason for this is that when silicon dioxide is used, a content of oxygen that irreversibly reacts with lithium is high, efficiency is decreased and lithium oxide produced during this reaction increases surface resistance of the anode active material.

Also, it could be seen that the anode active material according to Example 1 exhibited considerably high capacity maintenance after 50 charge/discharge cycles, as compared to the anode active materials surface-coated with only carbon of Comparative Examples 1 and 3. The reason for this is that the hydrophilic material performing the same function as SEI forms a strong bond with a core material via carbon and thereby inhibits removal of the SEI layer in the repeated charge/discharge process. Also, a material having high charge/discharge voltage is coated, thereby preventing precipitation of lithium and improving ion conductivity.

Industrial Applicability

As apparent from the fore-going, the anode active material according to the present invention is effective in greatly improving a battery fabrication process, minimizing deterioration in electrical conductivity and considerably inhibiting deterioration in battery lifespan through a specific core/composite coating layer structure and can minimize performance and safety problems associated with lithium precipitation through presence of a material having a high oxidation-reduction potential on the surface of the active material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An anode active material for secondary batteries, capable of intercalating and deintercalating ions, the anode active material comprising:
    a core consisting of a crystalline carbon-based material; and present on a surface of said core, a composite coating layer comprising one or more materials selected from a group consisting of low crystalline carbon and amorphous carbon, and silicon oxide capable of intercalating and deintercalating ions,
    wherein the composite coating layer has (i) a structure in which a filler comprising the silicon oxide capable of intercalating and deintercalating ions is uniformly distributed in a matrix comprising one or more materials selected from the group consisting of low crystalline carbon and amorphous carbon, or (ii) a structure in which a filler comprising one or more materials selected from the group consisting of low crystalline carbon and amorphous carbon is uniformly distributed in a matrix comprising the silicon oxide capable of intercalating and deintercalating ions;
    wherein an amount of the composite coating layer is 0.1 to 20% by weight, based on the total amount of the anode active material, and
    wherein the silicon oxide capable of intercalating and deintercalating ions is a compound represented by the following formula: SiOx wherein x satisfies 0.1<x<1.5.
2. The anode active material according to claim 1, wherein the crystalline carbon-based material comprises one or more of graphite and soft carbon.

3. The anode active material according to claim 1, wherein x satisfies $0.5<x<1.3$.

4. An anode mix comprising the anode active material according to claim 1.

5. An anode for secondary batteries in which the anode mix according to claim 4 is applied to a current collector.

6. A secondary battery comprising the anode for secondary batteries according to claim 5.

7. The secondary battery according to claim 6, wherein the battery is a lithium secondary battery.

8. A middle-or large-sized battery pack comprising the secondary battery according to claim 7 as a unit cell.

* * * * *